(12) United States Patent
Engert et al.

(10) Patent No.: US 9,027,823 B2
(45) Date of Patent: May 12, 2015

(54) WORKPIECE ARRANGEMENT

(75) Inventors: Tobias Engert, Abtsteinach (DE); Ivan Kojouharov, Zornheim (DE); Juergen Gerl, Dieztenbach (DE)

(73) Assignee: GSI Helmholtzzentrum fuer Schwerionenforschung GmbH, Darmstadt (DE)

( * ) Notice: Subject to any disclaimer, the term of this patent is extended or adjusted under 35 U.S.C. 154(b) by 637 days.

(21) Appl. No.: 13/058,598

(22) PCT Filed: Jul. 27, 2009

(86) PCT No.: PCT/DE2009/001047
§ 371 (c)(1),
(2), (4) Date: May 9, 2011

(87) PCT Pub. No.: WO2010/017798
PCT Pub. Date: Feb. 18, 2010

(65) Prior Publication Data
US 2011/0206940 A1 Aug. 25, 2011

(30) Foreign Application Priority Data
Aug. 12, 2008 (DE) .................. 10 2008 037 359

(51) Int. Cl.
*B23K 33/00* (2006.01)
*B23K 37/00* (2006.01)
*G01T 1/00* (2006.01)
(52) U.S. Cl.
CPC .. *B23K 37/00* (2013.01); *G01T 1/00* (2013.01)
(58) Field of Classification Search
None
See application file for complete search history.

(56) References Cited

U.S. PATENT DOCUMENTS

| | | | |
|---|---|---|---|
| 3,140,530 A | | 7/1964 | Certa |
| 4,278,892 A | * | 7/1981 | Baatz et al. ............... 250/506.1 |
| 4,535,214 A | | 8/1985 | Meyer |
| 4,943,001 A | | 7/1990 | Meyer |
| 4,987,519 A | * | 1/1991 | Hutchins et al. .............. 361/518 |
| 5,101,892 A | | 4/1992 | Takeuchi |
| 5,317,157 A | * | 5/1994 | Yoshida et al. ............... 250/352 |
| 5,604,349 A | | 2/1997 | Berst |
| 5,646,407 A | * | 7/1997 | Berst et al. ............... 250/370.15 |
| 5,816,052 A | | 10/1998 | Foote |
| 2001/0040024 A1 | | 11/2001 | Blanda |
| 2009/0280349 A1 | | 11/2009 | Bittendorfer |

FOREIGN PATENT DOCUMENTS

WO    WO 95/03555 A1    2/1995
WO    WO 2006010177 A2    2/2006

OTHER PUBLICATIONS

Search report for International Application No. PCT/DE2009/001047, mailed on Jan. 8, 2010.
DIN 8580, Manufacturing Process standards, Sep. 2003.

* cited by examiner

*Primary Examiner* — Mark Ruthkosky
*Assistant Examiner* — Daniel J Schleis
(74) *Attorney, Agent, or Firm* — Leydig, Voit & Mayer, Ltd.

(57) ABSTRACT

A workpiece arrangement includes at least two join regions of at least one workpiece that are joined together by a material-to-material connection seam. The material-to-material connection seam covers only a portion of a first of the at least two join regions. A thermal insulation device is disposed in an area of the material-to-material connection seam and corresponds to the first of the at least two join regions.

24 Claims, 9 Drawing Sheets

WORKPIECE ARRANGEMENT

CROSS REFERENCE TO RELATED APPLICATIONS

This application is a U.S. National Phase application under 35 U.S.C. §371 of International Application No. PCT/DE2009/001047, filed on Jul. 27, 2009, and claims benefit to German Patent Application No. DE 10 2008 037 359.1, filed on Aug. 12, 2008. The International Application was published in German on Feb. 18, 2010 as WO 2010/017798 A1 under PCT Article 21 (2).

FIELD

The present invention relates to a workpiece arrangement where at least two join regions of at least one workpiece are joined together by at least one material-to-material connection seam.

BACKGROUND

There are various methods for joining together two workpieces.

For example, two workpieces can be joined together with the aid of supplementary connecting elements. Such supplementary connecting elements can be screws, rivets and the like, for example. Over the years, such supplementary connecting elements have proven to provide a practical connection option in many areas of technology. With respect to the use thereof, these types of supplementary connecting elements have the inherent drawback that a preliminary machining of the workpieces to be joined together is required which, to some extent, can be quite complex (for example, drilling of holes for the rivets/screws), and in that space is required for the supplementary connection elements (for example, projecting screw ends and rivet ends).

Another connection option is to provide the parts to be joined together with a special form design. The form design is selected to maintain or reinforce the connection when the two joined-together parts are loaded in a direction that corresponds to the normal loading of the connection. The two joined-together parts are only separable from one another, if at all, in a direction opposing that of a normal loading of the connection. However, it is also possible to prevent the two joined-together parts from becoming detached even when a load acts on the joint opposite to the usual loading direction. For this purpose, clip-type latching connections can be used, for example. Connection techniques of this kind are normally referred to as form-locking connections.

Connections generally referred to as material-to-material bonds make up another class of possible connection techniques. In these connections, the materials, respectively surface regions in question, are intimately joined together. One differentiates here between joining techniques which provide that the workpieces to be joined together be made of a substantially homogeneous kind of material, and/or have a substantially similar melting point, and those which optionally provide for additionally introducing a joining material made of a substantially homogeneous kind of material, and/or having a substantially similar melting point. In this case, one speaks of welded connections. Welded connections are normally produced by a local heating of the surface regions to be joined to one another. However, there are also cold-welding methods.

When, on the other hand, the materials to be joined together, and/or the optionally, additionally introduced joining material, are dissimilar and/or have significantly different melting points, then one speaks of a brazing or of an adhesive bonding. The term brazing typically applies when a local increase in temperature is used to produce the material-to-material bond of the materials to be joined to one another, thereby melting or softening at least one of the materials used for forming the connection. On the other hand, an adhesive bonding process employs an adhesive in an originally liquid or pasty form. This adhesive is introduced between the workpiece surface regions that are to be joined to one another. There, the adhesive must first cure before load can be applied to the joint. The curing process can be carried out, for example, by the escaping of solvents or by chemical reactions (particularly in the case of multi-component adhesives). Many material pairings also require the use of supplementary adhesion promoters. Moreover, the curing process can be accelerated by employing external measures, such as heating of the adhesive joint, for example.

It is, of course, also customary to combine two or more joining techniques. This makes it possible to combine the various advantages inherent in the concepts of different joining methods.

Although there are significant advantages associated with material-to-material joining techniques, they prove to be problematic for many applications.

For example, adhesive bonding techniques often require relatively long curing times, which can prove detrimental to a speedy and efficient manufacturing of articles. The heating of adhesive bonding regions is often not feasible, since, due to thermal conduction, thermal energy can be conducted into areas where a thermal energy input is problematic.

Also in the case of brazed or welded connections, problems may arise due to thermal conduction into the materials to be joined to one another. This is not only due to an unwanted heating of regions that are located at a distance from the brazed or welded joint. The situation may particularly arise when materials of different thicknesses are brazed or welded, where it is necessary to supply thermal power at significant levels due to the dissipation of heat in the thick material. This can degrade the quality of the brazed or welded joint and, in some instances, lead to damage to the thin workpiece. Therefore, at the present time, materials that differ greatly in thickness are typically not welded or brazed together, and other joining techniques are used alternatively.

Another problem encountered in material-to-material joining methods is that liquid and/or gaseous materials are often released when the material-to-material connection seam is formed. In the case of adhesive agents, for example, such materials can form during the curing reaction due to the gas emission of solvents or the formation of gaseous substances. In the case of brazed or welded connections, such gaseous substances can be formed by the local, typically mostly intense heating of the join regions. This is especially true since, for brazing or welding processes, material mixtures (for example, special metal alloys) are often used, whose purpose is to ensure a most stable and permanent possible connection and/or to lower the melting point or softening point of the material in question. However, there is often a tendency for the fluxing agents used in the process to be released under intense heating. However, in many fields of application, there can be very negative consequences to the release of material. This is because many technical devices have extremely sensitive reactions to impurities. Detector materials, such as those used for radioactive radiation, are mentioned purely exemplarily in this context.

Moreover, WO 95/03555A1 describes a capsule for a detector that functions in an ultra-high vacuum. The gamma spectroscopy detector, which functions in an ultra-high vacuum, is housed in the capsule which has a bakeable getter element to maintain the ultra-high vacuum. The getter element is configured inside of the capsule in a getter sleeve that is separated from the detector by a thermal protection, in order not to damage the detector, which, in particular, can be a germanium detector, during baking of the getter. The thermal insulation of the detector and getter element is realized by a meandering channel configuration between the detector and the getter element. However, it turns out that it is not possible to achieve an adequate pumping capacity through the getter element, particularly under the high vacuum present in a meandering channel configuration. Moreover, as before, the detector is still subject to contamination and damage from particles released from the getter element.

SUMMARY

In an embodiment, the present invention provides a workpiece arrangement including at least two join regions of at least one workpiece that are joined together by a material-to-material connection seam. The material-to-material connection seam covers only a portion of a first of the at least two join regions. A thermal insulation device is disposed in an area of the material-to-material connection seam and corresponds to the first of the at least two join regions.

BRIEF DESCRIPTION OF THE DRAWINGS

Exemplary embodiments of the present invention are described in more detail below, making reference to the drawings, in which.

DETAILED DESCRIPTION

Figure 1:
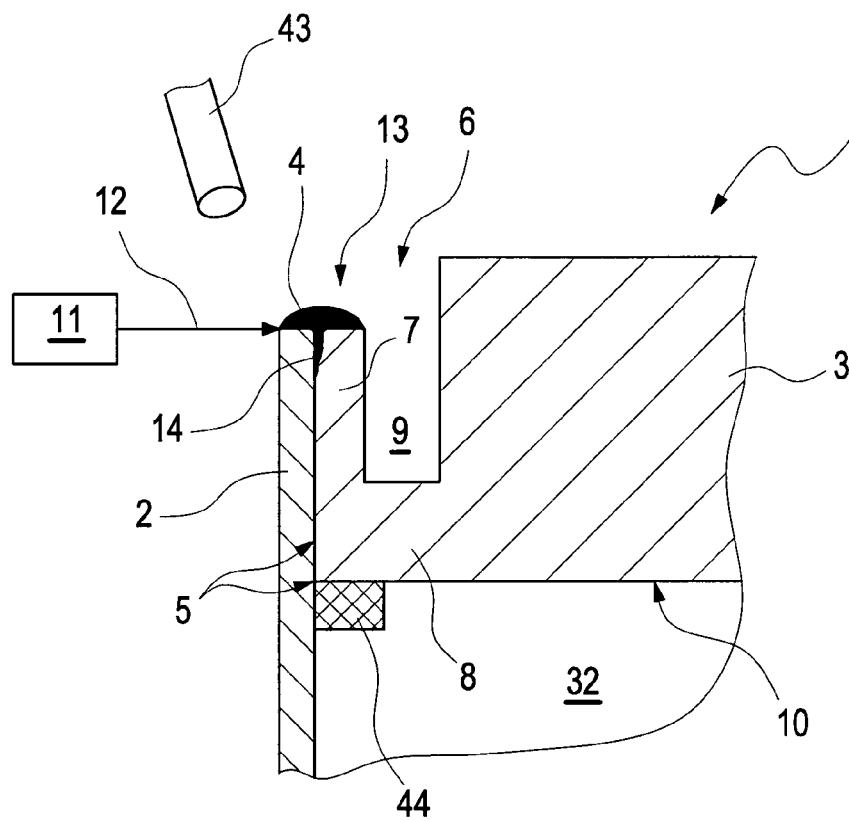
FIG. 1 shows an embodiment of a weld seam for joining two assemblies in a schematic cross section.

In an embodiment, the present invention provides improved material-to-material joining methods and, in particular, broadens their potential application spectrum.

In an embodiment, the present invention provides a workpiece arrangement, where at least two join regions of at least one workpiece are joined together by at least one material-to-material connection seam, that are formed in such a way that, given at least one join region, at least one thermal insulation device is provided in the area of at least one material-to-material connection seam. Thus, thermal energy, which may have been introduced into the region of the connection seam, is very easily able to remain in the join region. In other words, in some instances, less thermal energy is removed from the join region. This may make it possible to reduce the heat input that is required in the particular case. Also, the remaining regions of the workpiece arrangement may be protected from unnecessary thermal loading. Of course, this is also true, for example, for parts, devices and other assemblies (such as measuring elements, sensors, cables, detectors, etc.) that may be connected to one part of the workpiece arrangement. A material-to-material connection seam may also be understood in the present context as a configuration (for example, a linear configuration) of connection points. The thermal insulation device generally remains permanently in the workpiece arrangement. Of course, this does not rule out a thermal insulation device being hardened or filled, for example, following formation of the material-to-material connection seam. The provision of a thermal insulation device may, in fact, result in a weakening of the workpiece region in question since the thermal insulation device generally has a lower structural strength than does the remaining material of the workpiece. Generally, however, as the inventors have surprisingly discovered, the disadvantageous effects of such a design are clearly more than compensated by the advantages thereof. This holds true, in particular, when the thermal insulation device—as mentioned above—is hardened and/or filled following formation of the material-to-material connection seam, thereby making it normally possible to at least minimize any existing structural weakening.

The workpiece arrangement may have at least two workpieces that are joined together. In this manner, a plurality of assemblies may be joined to form an overall arrangement, a device or a housing. The advantages of the described method make it possible for even very dissimilar assemblies to be joined. Naturally, it is likewise conceivable for different join regions of one and the same workpiece to be joined together. It is thereby possible, for example, for a type of sheet metal to be bent upon itself (for example, to form a cylinder envelope or a parallelepiped), and for the mutually contacting sheet metal regions (for example, in the form of a lap joint or an edge joint) to be subsequently joined together. In particular, the structural form of the sheet metal may also vary in thickness. For instance, it may be less thick in one region and, however, more thick in another region.

Also, at least one material-to-material connection seam can be formed as a thermal connection seam, in particular, as a brazed and/or welded seam. Thermal connection seams of this kind, where the material-to-material bond is normally formed by an at least regional melting or an at least regional softening of one of the materials involved, often produce especially stable and permanent connections. Such thermal connection seams are also often able to be formed very quickly. Once the influx of thermal energy ends, the join region normally cools very quickly, so that, following a brief period of time, a bond is produced that is able to be subject to load. In particular, curing times, as generally occur when adhesives are used, may be shortened.

In an embodiment, at least one thermal insulation device can be formed as a region of thinned material, in particular as a recess, preferably as a groove-type recess and/or as a web-type projection. Such a thermal insulation device may be realized very simply by employing mechanical machining measures, such as material-removal machining processes and/or material-deformation machining processes. In particular, it is generally unnecessary to provide measures for fastening the thermal insulation device to or into the workpiece in question. The thermal insulation device may even be considered already during the manufacture of the particular workpiece, for example, when an extrusion-pressing process is used for its manufacture.

It may be beneficial when, relative to the contact region and/or to the joint region of at least two join regions, at least one material-to-material connection seam is configured, at least regionally, asymmetrically, in particular, laterally and/or in an edge region. This type of configuration generally makes it easier to introduce thermal energy from the outside into the join region. Because the introduced thermal energy is able to escape through a smaller angular space (for example, only 90°), the thermal energy that is introduced in the particular case may again be additionally concentrated in the actual seam region. Should the formation of the material-to-material connection seam cause gaseous substances to escape, then the releasing thereof may be deflected to one side. This makes it possible to avoid any contamination of a region facing away from the material-to-material connection seam. Furthermore, it is particularly useful when the asymmetry is disposed toward the side where the thermal insulation device is provided. Thus, for example, a sequence of edge—connection seam—thermal insulation device may be provided. In the case of the joint of the joint region, it may be any kind of joint, such as a butt joint, a lap joint, a corner joint, a T-joint, a parallel joint, a cross joint, a multiple joint, an oblique joint, etc.

In the case of the workpiece arrangement according to embodiments of the present invention, it may prove to be useful for at least two of the joined together join regions, in particular, two joined together workpieces, to differ in thickness, at least regionally. In previous material-to-material joining methods, the dissipation of heat through the thicker join region often necessitated a subsequent, very high input of thermal energy. This thermal energy input often had to be selected to be so high that the thinner join region was damaged as a result. Accordingly, such bonds were often not stable or permanent enough. To some extent, it was not possible to produce such workpiece arrangements, so that one had to resort to other joining methods.

Another practical, optional refinement may result when at least one join region, in particular at least one workpiece, is formed to be planar and/or plate-like in some areas. Workpieces of this kind are especially suited for the application of long material-to-material connection seams. Such workpiece arrangements also facilitate a very efficient introduction of the optionally introducible thermal energy. It is self-evident that a plate-like design also encompasses sheet metal of any given thickness and/or type, such as thin sheets, extra-thin sheets, plates, etc.

Moreover, it may be useful for at least two join regions, in particular at least two workpieces, to be configured at least regionally to be substantially linear and/or at least regionally at a substantially right angle to one another. Here as well, the optionally required thermal energy that is to be introduced, may be delivered very advantageously to the connection seam; respectively, it remains very effectively in the region of the connection seam. Moreover, the thermal insulation devices are very readily configurable at an especially effective location.

The workpiece arrangement may be designed to allow at least two join regions, in particular, at least two workpieces, to be provided at least regionally with a transition fit and/or a force fit, in particular with an H7 fit. This makes it easily possible to realize a defined positional pre-fixation of the two join regions relative to one another. This kind of fit also makes it possible to suitably limit the depth of a weld seam or of a brazed seam. Another advantage may be derived when a such a fit provides a certain resistance to substances that are potentially released during formation of the material-to-material connection seam. This makes it possible to effectively and very simply reduce and, in some cases, even essentially completely prevent a contamination of the interior of the receptacle. The use of an H7 fit has proven to be simple and cost-effective in terms of manufacturing and, at the same time, however, particularly effective.

It may also prove to be beneficial for at least one join region, in particular, at least one workpiece and/or at least one bonding material to include a material that is selected from the group that includes metal, metal alloys, aluminum, aluminum alloys, $AlMg_3$, $AlMg_{4.5}Mn$, steel, steel alloys, stainless steel, copper, copper alloys, nickel, nickel alloys, materials characterized by low gas emission rates and/or materials that are free of gas emission. Such materials make it possible to form particularly durable and stable bonds. The already mentioned, unwanted gas emission of fluxing agents may also be reduced, minimized or even eliminated, especially in the case of materials characterized by low gas emission rates or that are gas emission-free, respectively.

It may be advantageous for at least one material-to-material connection seam to have a separable design and, in particular, for it to be separable and rejoinable. This is possible, for example, when an additional material, which exhibits an especially low melting point or material destruction point, is used to form the material-to-material connection seam. If the join region in question is brought to or above the appropriate temperature (which is very readily possible, in particular, due to the thermal insulation device), then the bond may be released in this manner, and, as the case may be, also resealed. It is, of course, also possible to separate off the region having the connection seam. This may be accomplished mechanically, for example, using methods outlined in DIN 8580 under the generic term "separation" in accordance with the categorization of manufacturing methods. In particular, the separation may be accomplished using sawing, lathe turning, milling or filing processes. However, the separation may also be accomplished in a different manner, for example, using a laser. The separation is made easily possible by providing a thermal insulation device, especially when it is in the form of a recess. A separable construction is understood, of course, to not only include those designs that allow very frequent, respectively any desired number of separations and reconnections, but also those designs which allow only a certain number of separation processes (for example, two, three, four, five, six, seven, eight, nine or ten).

It may also be advantageous for the material-to-material connection seam to be designed to be leak-tight and/or fluid-tight, preferably liquid-tight, gas-tight, vacuum-tight, helium-tight and/or hydrogen-tight. This allows the material-to-material connection seam formed to have an especially universal application. Such a material-to-material connection seam may be used for liquid tanks, gas tanks and/or vacuum installations, for example. A fluid may generally be understood to be a gas, a liquid, a mixture of gas and liquid, a supercritical fluid, a mixture of gas and solids (smoke), a mixture of liquid and solids (suspension) and/or a mixture of gas, liquid and solids.

Moreover, the material-to-material connection seam may be formed in a protective atmosphere. This generally makes it possible to significantly improve the quality of the connection seam, particularly when working with especially sensitive materials and/or especially aggressive environments. For example, iron welding or aluminum welding in normal ambient air is generally already problematic due to the oxygen content and/or the hydrogen content of the air. The improved quality attained by providing a protective atmosphere is generally so significant that a connection seam formed in a protective atmosphere is usually readily distinguishable from a connection seam that is not formed in a protective atmosphere. In this context, the protective atmosphere may be of any given type. For example, it may be realized by a processing in a protective gas-filled chamber or by the supplying of a jet of protective gas into the region where the material-to-material connection seam is formed. In this context, neon, helium, argon, krypton, carbon dioxide or nitrogen may be used as protective gas. A processing under vacuum (or reduced pressure) is also conceivable. Particularly when the protective atmosphere is delivered in the form of a jet of protective gas to the join region, it may serve as a type of "scavenging device." Such a "scavenging device" is often also referred to as a "cross jet." In this case, a jet of protective gas may be used to selectively remove gases that may have been released from the area of the molten weld pool.

The present invention also provides a housing, in particular, a housing for devices operated under vacuum and/or protective gas that has at least one workpiece arrangement having the above described configuration. An especially durable, stable and, as the case may be, especially impervious housing (gas-tight/liquid-tight) may be thereby realized. Due to the fact that even assemblies that differ greatly in thickness may be used to form the housing, it is possible to reduce the overall weight of the housing compared to known housings. This is possible, for example, because the housing walls are formed with different thicknesses in the different regions. Moreover, the housing according to particular embodiments may analogously feature the advantages and properties already mentioned in connection with the described workpiece arrangement. The protective gases already mentioned in connection with the connection seam formed in a protective atmosphere are suited for use as a protective gas.

A housing is additionally or alternatively provided that features at least one interior housing space, as well as at least one receiving region for accommodating a getter material, and that is formed in such a way that the connection between the at least one housing interior space and the at least one receiving region for accommodating a getter material, is realized as a particle-impervious connection. In particular, the housing may be a housing for devices operated under vacuum and/or protective gas. A getter material is generally understood, in particular, to be a material that is capable of binding substances (in particular, gaseous substances) by chemical and/or physical sorption and, in this manner of "removing" them from the ambient environment. Such a getter material makes it possible, in particular, to produce a partial vacuum, respectively a vacuum (especially a high vacuum and/or an ultrahigh vacuum), respectively to maintain it over an extended period of time. In the case of the housing, a (normally large-volume) interior housing space is provided, which is used, for example, for accommodating a detector, some other measuring device and/or some other technical device. In addition, a receiving region is provided in the housing, which, in particular, may be used for accommodating a getter material (as previously described) and, in some instances, may also be used for other devices, where the preference is that it be configured to a certain degree separately from the interior housing space and/or the technical devices accommodated therein. To ensure an especially high functionality, for example, of a detector to be operated in a high vacuum that is accommodated in the interior housing space, it may be desirable to ensure a most direct and immediate possible fluid communication (particularly with regard to gases) between the receiving region and the interior housing space. On the other hand, it can be harmful when particles, for example, particles in the getter material located in the receiving region of the housing, form due to the sorption of gases, and are subsequently able to fall off from the getter material "block" and come in contact with the device (such as a detector, for example) located in the interior housing space. Therefore, to at least substantially avoid this type of impairment of or damage to the device located in the interior housing space, embodiments of the present invention may include the connection between the at least one housing interior space and the at least one receiving region be realized as a particle-impervious connection. In this context, an important aspect of the is the imperviousness to particles, in particular to particles in solid form. However, depending on the particular requirement, other aspects of the particle-impervious connection may also include an especially short length of the connecting channel and/or an especially large cross section of the connection channel. This type of design implementation makes it possible, for example, to achieve a comparatively high pumping rate with the aid of the getter material. Depending on the particular requirement, it may also prove to be useful to develop the connection between the interior housing space and the receiving region to be thermally insulating as well (if indicated, in order in this way to also thermally protect the device located in the interior housing space). Conversely, this type of thermally insulating formation of the connection between the interior housing space and the receiving region may also prove to be disadvantageous, however, since a thermally insulating formation of this kind is normally associated with an increased resistance to the passage of fluids, particularly when it is a question of the motion of fluid in the vacuum (especially a high vacuum and/or an ultrahigh vacuum). Where necessary in this case, the thermal protection may also be realized by other technical measures. It is pointed out that protection may be sought for the housing formation using a particle-impervious connection, both alone, as well as in combination with one or a plurality of the already mentioned features and/or in combination with the features to be still mentioned in the following. In particular, the housing provided in accordance with the present invention may be used for receiving devices that are operated under vacuum and/or protective gas.

In particular, the housing can be designed in such a way that the particle-impervious bond has at least one filter device. The filter device is preferably designed to allow gases, in some instances, also liquids and/or supercritical fluids, possibly having only low fluid resistance, to pass through, but, on the other hand, to largely prevent the passage of particles in solid form (in some instances, even particles in fluid form). The filter device may have a single- or multilayer design, for example. It is, of course, also possible for the filter device to utilize one or a plurality of principles for filtering the particular particles to be restrained. At least one filter device preferably has at least one mesh material, preferably a plurality of mesh materials. Depending on the particular design, mesh materials of this kind may substantially restrain particles, but, on the other hand, allow gaseous substances (in some instances, also other fluids) to pass through, impeded only relatively slightly. Depending on the density of the mesh material (respectively, the mesh materials), particles which exceed a certain size may be restrained, for example. A further advantage of the mesh materials is that they may be fabricated of steel or of some other material that, on the one hand, has a high strength, and, on the other hand, is able to be simply treated in a way that ensures that it does not produce any virtual leakage, particularly during a vacuum operation (as the case may be, following an appropriate pretreatment, such as baking of the system, for example). Moreover, filters of a mesh material (or of a plurality of mesh materials) are commercially available in the field of foodstuffs, for example, so that a cost-effective implementation of the approach according to the present invention is possible. If a plurality of mesh materials are provided, they may be formed in any desired manner (partially) with a substantially identical mesh aperture and/or with different mesh apertures.

The housing can be designed in such a way that at least one receiving region for accommodating a getter material is formed at least regionally in a material region of the housing that has a massive construction. In particular, it may be a cover of the housing that normally already has a relatively substantial thickness, which is required, for example, for accommodating high-voltage bushings, gas feed lines, instrument leads and the like, and which, moreover, should be designed to be vacuum-tight. This type of design implementation makes it possible, in particular, to avoid "losing" space that is needed for accommodating technical devices in the interior housing space. It is also generally possible to implement the particle-impervious bond in a technically especially simple manner.

In embodiments of the present invention at least one getter material can be located at least in one of the receiving regions for accommodating a getter material. At least one getter material may preferably be formed as thermally activatable getter material. If getter material is located in a receiving region that is designed to be impervious to particles from the interior housing space, it is then possible to realize an especially high level of protection against damage to or destruction of the technical device (for example, a detector) accommodated in the interior housing space, and, at the same time, still maintain a good pumping capacity through the getter material. When the getter material is a thermally activatable getter material, it is then possible to substantially avoid a "consumption" of the getter material by sorption prior to the vacuum-tight sealing of the housing. In particular, it is also possible to maintain the vacuum (in particular, ultrahigh vacuum) in the housing over a particularly long period of time, especially when the getter material is "reactivated" by thermal activation in specific time intervals.

It may be advantageous to provide at least one fluid line that penetrates the housing wall and is preferably material-to-material sealable. In this case, once it is completed, the housing may be very readily evacuated and/or filled with a specific gas fill (protective gas). Subsequently to the filling, respectively evacuation processes, the fluid line may be sealed, allowing the housing to be easily handled as a self-contained unit following the sealing of the same. In particular, the danger of later leakage may be minimized by metallurgically sealing the fluid line.

The fluid line is preferably a fluid line having an initial (undeformed) fluid-passage cross section, the initial fluid-passage cross section first being reduced in a first step, and, subsequently, in a second step, the reduced fluid-passage cross section being material-to-material sealed. The reduction (tapering) of the fluid-passage cross section may be accomplished, for example, by a crimping and/or a kinking of the fluid line. The tapering of the cross section of the fluid passage opening enables the subsequent material-to-material sealing to be accomplished using a reduced supply of material. The cross section of the fluid passage opening may be reduced to the point where, following the first step, in which the cross section of the fluid passage opening of the fluid line is reduced, at least portions of the inner wall of the fluid line make contact in certain regions. The material-to-material sealing of the reduced cross section of the fluid passage opening may, in particular, be carried out using a thermal sealing process, such as a brazing and/or a welding process, for example. However, other sealing methods, such as adhesive bonding, are possible, for example. The energy required for a thermal sealing process may be introduced with the aid of an energy-input device, preferably in the form of thermal energy. The energy input device may be selected from the group that includes lasers, excimer lasers, semiconductor lasers, $CO_2$ lasers, dye lasers, solid-state lasers, gas lasers, sources of acoustic energy, ultrasound sources, electron beam sources, electrical resistance devices, high current electrical sources and frictional energy input devices. The material of the fluid line and/or a possibly used sealing material may, in particular, include a material that is selected from the group that includes metal, metal alloys, aluminum, aluminum alloys, $AlMg_3$, $AlMg_{45}Mn$, steel, steel alloys, stainless steel, copper, copper alloys, nickel, nickel alloys, materials characterized by low gas emission rates and/or materials that are free of gas emission. In its initial state, the fluid line may have a tubular form, at least in portions thereof. In particular, the fluid line may have a round, oval, elliptical or circular cross section, at least in portions thereof. Moreover, the fluid line may be cut to length once the cross section of the fluid passage opening has been reduced and/or material-to-material sealed. The fluid line may preferably be sealed using a multifunction tool capable of performing at least two of the following steps: reducing the cross section of the fluid passage opening of the fluid line; material-to-material sealing the reduced cross section of the fluid passage opening; cutting the fluid line to length. Using the process for sealing the fluid line as provided in accordance with the present invention, it is possible, in particular, to form a tight (liquid-tight, gas-tight, fluid-tight, vacuum-tight, high vacuum-tight, helium-tight and/or hydrogen-tight) seal of the fluid line in an inexpensive and uncomplicated manner. The housing that is sealed in this manner (including the sealed fluid line) may be operated over a long period of time under vacuum or under protective gas. Moreover, gases that are potentially released in the course of sealing of the fluid line and that may be harmful to an object located in the housing, may be released in a significantly smaller quantity or even not at all.

In an embodiment, the present invention also provides a device, in particular a device operated under vacuum and/or protective gas, that has at least one workpiece arrangement having the above described configuration and/or at least one housing having the above described configuration. Analogously, such a device has the properties and advantages already described in connection with the workpiece arrangement, respectively in connection with the housing described above.

The device may preferably be designed as a detector, in particular as a semiconductor detector. Such detectors or semiconductor detectors, which are located in a housing, are used, for example, for detecting radioactive radiation or particle radiation (alpha radiation, beta radiation, protons, neutrons, electrons, atomic nuclei, etc.). They are normally operated in a vacuum and/or in a cooled state in order to exhibit the best possible measuring properties (in particular, good detection properties and low noise levels). Thus, the device according to embodiments of the present invention can provide a significant improvement over known devices.

Finally, in an embodiment, the present invention provides for further refining a method for joining at least two join regions of at least one workpiece, where the join regions are joined together, at least regionally, by at least one material-to-material connection seam in such a way that at least one of the join regions is thermally insulated, at least regionally, during formation of the material-to-material connection seam. This method analogously features the advantages and properties already described in connection with the described workpiece arrangement. In particular, it is also possible to further refine the method through method features, which correspond analogously to the features, properties, advantages and further refinements, in accordance with the present invention, of the above described workpiece arrangement, of the above described housing, and/or of the above described device.

It is, of course, also possible to use the method according to the present invention for designing a workpiece arrangement having the above described configuration, to form a housing having the above described configuration, and/or to form a device having the above described configuration.

It may also be practical for thermal energy to be introduced by an energy-input device into at least one join region (active), the energy-input device preferably being selected from the group that includes lasers, excimer lasers, semiconductor lasers, $CO_2$ lasers, dye lasers, solid-state lasers, gas lasers, sources of acoustic energy, ultrasound sources, electron beam sources, electrical resistance devices, high current electrical sources and frictional energy input devices. What is generally referred to as friction welding is made possible with the aid of sources of acoustic energy, ultrasound sources and/or frictional energy input devices, for example. With the aid of resistance devices, thermal energy may be produced, which, for example, may be supplied via a material contact to the join regions and/or to a joining material. A classic soldering iron works in accordance with this principle, for example. An electric welding (for example, electric arc welding) is possible using high current electrical sources, for example.

A method for joining at least two join regions of at least one workpiece may be implemented, in particular, by the following method steps:
  at least one thermal insulation is provided in at least one region of at least one workpiece that is adjacent to at least one join region of the workpiece;
  the join region is configured adjacently to another join region,
  the other join region belonging to the same workpiece and/or to at least one further workpiece;
  a material-to-material connection seam being formed.

In a schematic cross section, FIG. 1 shows an exemplary embodiment of a capsule 1, where two components 2, 3 are joined together in a material-to-material bond with the aid of a weld seam 4. For reasons of clarity, only a portion of capsule 1 is shown in FIG. 1.

One of the two components 2, 3 is a thin sheet 2 of an aluminum alloy. In accordance with DIN 1623, a thin sheet is understood to be sheet metal having a thickness d of ≤3 mm. In the present exemplary embodiment, capsule 1 is a connection of a cover 3 and a thin sheet 2. Thin sheet 2 forms capsule sheath 2 for capsule 1. Together, capsule sheath 2 and cover 3 form a housing 31 for a semiconductor detector 35 for measuring ionizing radiation (compare FIG. 6). To ensure the functionality of resulting semiconductor detector 31, capsule sheath 2 has a very small thickness of only 0.6 mm in the present case. It is self-evident that other thicknesses d could also be selected for capsule sheath 2, such as d≤2.5 mm, 2 mm, 1.5 mm, 1 mm, 0.75 mm, 0.5 mm, 0.25 mm, 0.2 mm, 0.1 mm, 0.09 mm, 0.08 mm, 0.07 mm, 0.06 mm or 0.05 mm, for example. In comparison, cover 3 has a substantially greater thickness of 15 mm in the present case. Thus, it comes under the definition of a plate in accordance with DIN EN 10029 (in accordance herewith, plates are defined by a thickness d of ≥3 mm). Of course, other thicknesses, such as 10 mm, 12 mm, 14 mm, 16 mm, 18 mm, 20 mm, 22 mm or 25 mm, for instance, are also conceivable. Intermediate values are conceivable both for cover 3, as well as for thin sheet 2. Cover 3 is also made of an aluminum alloy. The aluminum alloys of capsule sheath 2 and of cover 3 are selected to substantially correspond. Capsule sheath 2 (which, for example, takes on the shape of a cylinder envelope) and cover 3 (which is designed as a circular disk, for example) are dimensioned to be able to fit very precisely into each other. In this context, a certain play (also referred to as tolerance) naturally remains in contact region 5 of thin sheet 2 and cover 3. An H7 fit according to EN 20286 was realized in the presently illustrated exemplary embodiment. In this manner, a mechanical pre-fixing of thin sheet 2 and cover 3 is achieved prior to the formation of weld seam 4. To this end, an outer diameter of 79.60 mm, for example, is selected for cover 3, while the inner diameter of thin sheet (2), which is bent into a hollow cylinder, is 81.40 mm.

Another mechanical pre-fixing of cover 3 and thin sheet 2 is accomplished by supporting segment 44 which is provided on thin sheet 2.

As is readily discernible in FIG. 1, cover 3 has an undercut contact segment 7 in its edge area 6 facing the contact region that contacts thin sheet 2 two-dimensionally and thereby forms contact region 5. Contact segment 7 is connected via a bridge segment 8 to the actual cover. Contact segment 7 is undercut by a groove 9 located between contact segment 7 and main body 10 of cover 3.

As is likewise readily discernible from FIG. 1, the length of contact segment 7 is less than the thickness of main body 10 of cover 3. This protects contact region 5 and weld seam 4 to a certain degree from external mechanical influences. In the exemplary embodiment illustrated in the present case, the length of contact segment (7) is 12 mm; the thickness of contact segment 7 is 0.9 mm; and the thickness of bridge segment 8 is 2 mm.

However, other dimensions may also be selected, such as a 2.5 mm length for contact segment 7 and a 9.5 mm thickness for bridge segment 8.

To join together thin sheet 2 and cover 3, a $CO_2$ laser 11 produces a laser beam 12, which, in the exemplary embodiment illustrated in the present case, is incident on contact region 5 in an end face portion 13 of thin sheet 2 and contact segment 7. The laser power may be 2 or 2.5 kW, for example. In the present case, laser beam 12 is directed to contact region 5, essentially normally to the surface of thin sheet 2. It is, of course, also possible for laser beam 12 to be directed at other angles to contact region 5. Angles of 0° (parallel to the surface of fine sheet 2) of 30°, 45° and/or 60° are suitable in this case. Impinging laser beam 12 induces a local heating in end face portion 13 of contact region 5. The parameters of laser beam 12 are adjusted in such a way that the aluminum alloy of thin sheet 2 and of the cover forms a bond in pasty or liquid form, and, at the same time, in such a way that a portion of the liquid mass enters into contact region 5 between thin sheet 2 and cover 3 within the predefined tolerance. A weld seam 4 is thereby formed. The liquid material, which has entered into contact region 5, forms weld root 14 that is discernible in FIG. 1. Due to the H7 fit selected in the present case, weld root 14 has only a small thickness and, following fabrication of weld seam 4, does not leak into capsule interior 32.

At the same time as laser beam 12, an inert gas is directed into the region of weld seam 4 via a protective gas nozzle 43. This prevents an oxidation by atmospheric oxygen of the material in the region of weld seam 4. In the present case, neon is used as a protective gas.

Due to the undercutting of contact segment 7 with the aid of groove 9, only a small heat-conducting surface is available through which heat may dissipate from weld seam location 4. Thus, groove 9 acts as a thermal insulation device for forming weld seam 4. Naturally, the provision of a groove 9 results in a weakening of the mechanical strength of cover 3. However, since thin sheet 2 constitutes the mechanically most critical portion of assembly 1, as is readily apparent in FIG. 1, the weakening of the stability of cover 3 is essentially insignificant.

In the exemplary embodiment illustrated in FIG. 1, it is possible for thin sheet 2 and cover 3 to be welded together without filler materials and/or without welding fillers. Since it is possible to eliminate such materials, there is merely a minimal—if any at all—releasing of vapors during the welding process in the area of weld seam 4. This property of the welding method is exceedingly beneficial when it is necessary, for example, for materials, which have a very sensitive reaction to foreign substances, to be sealed. Since laser beam 12 impinges in end face portion 13 of thin sheet 2 and contact segment 7 of cover 3, any potentially released vapors preferably escape upwardly. Moreover, relatively long contact region 5 between thin sheet 2 and contact segment 7 of cover 3 effectively prevents gaseous materials from passing through to interior 32 of capsule 31. The H7 fit and/or supporting segment 44 provide an additional protection of capsule interior 32 from such potentially released vapors. This additionally protects materials 35 located in capsule interior 32.

Finally, the supplying of an inert gas with the aid of protective gas nozzle 43 also protects capsule interior 32 from potentially released vapors. This is because the entering gas jet in the form of a "cross jet" has the effect of allowing combustion residues from the weld pool to be released in a controlled manner into the region of groove 9. However, if the vapors are expelled into groove 9, they cannot contaminate capsule interior 32.

Another advantage of a welding of thin sheet 2 and cover 3 in end face portion 13 is evident in that an opening (and as the case may be, a subsequent resealing) of a capsule 1, 31 sealed in this manner is very readily possible. In particular, a contamination of capsule interior 32 may be effectively prevented by long contact region 5 between thin sheet 2 and cover 3, as well as by supporting segment 44. Assembly 1 may be opened, for example, by subjecting weld seam area 4 (including weld root 14) to an appropriate temperature. A mechanical removal of end face portion 13 is also possible, however. In this case, the number of possible opening operations is naturally limited for geometric reasons.

Figure 2:
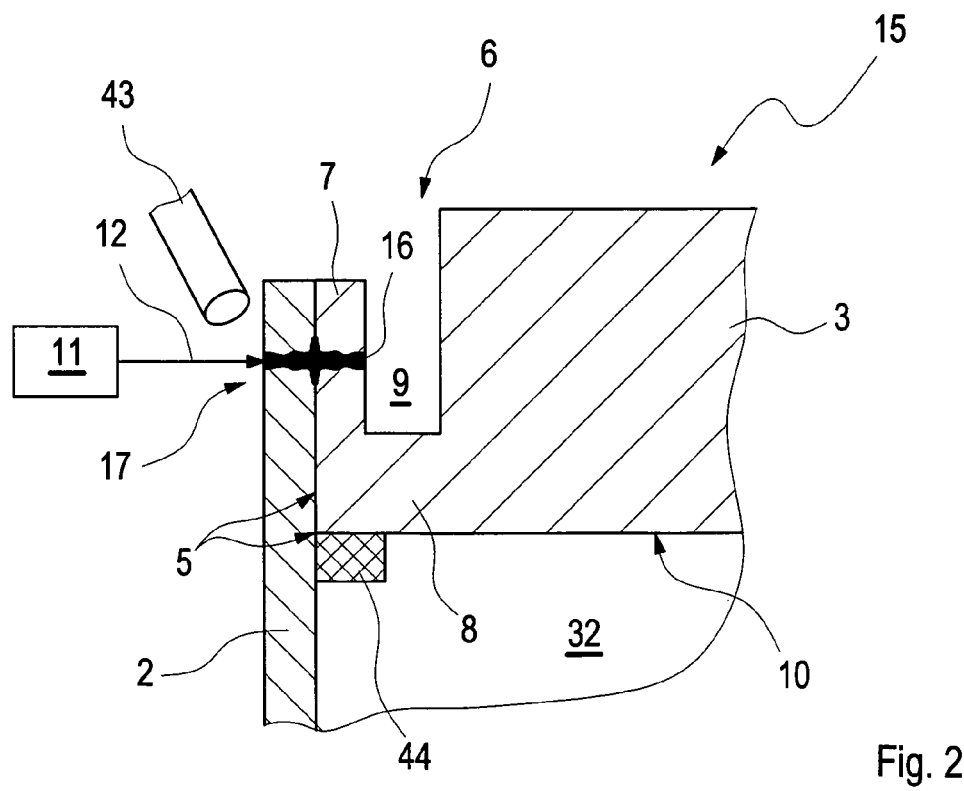
FIG. 2 shows another embodiment of a weld seam for joining two assemblies in a schematic cross section.

Another embodiment of a capsule 15 is illustrated in FIG. 2. Similarly to FIG. 1, for reasons of clarity, merely one enlarged detail including a contact region of cover 3 and capsule sheath 2 (a thin sheet) is shown. Apart from that, capsule 15 shown in FIG. 2 largely corresponds to capsule 1 shown in FIG. 1. Accordingly, equivalent components are denoted by the same reference numerals.

However, in contrast to capsule 1 shown in FIG. 1, in the case of capsule 15 shown in the present case, weld seam 16 is provided in a central area 17 of contact region 5 between capsule sheath 2 and contact segment 7 of cover 3. The bond features an especially high strength due to central configuration 17 of weld seam 16. It would also be conceivable to combine a centrally configured weld seam 16 (FIG. 2) with a weld seam 4 that is configured at the edge (FIG. 1), in order to thereby achieve a bond that is reinforced once again.

In spite of the position of weld seam 16 in a central area 17 of contact region 5, virtually no combustion gases enter into interior 32 of capsule 15. This is because, in this case, the front side of weld seam 16, in particular, however, the rear side of weld seam 16 (facing groove 9) may allow any potential combustion gases to flow out. Thus, the combustion gases escape via groove 9 toward the outside of capsule 15. Supporting segment 44 provided analogously to FIG. 1 also acts as an additional barrier for gases that are potentially released in the area of weld seam 16.

Figure 3:
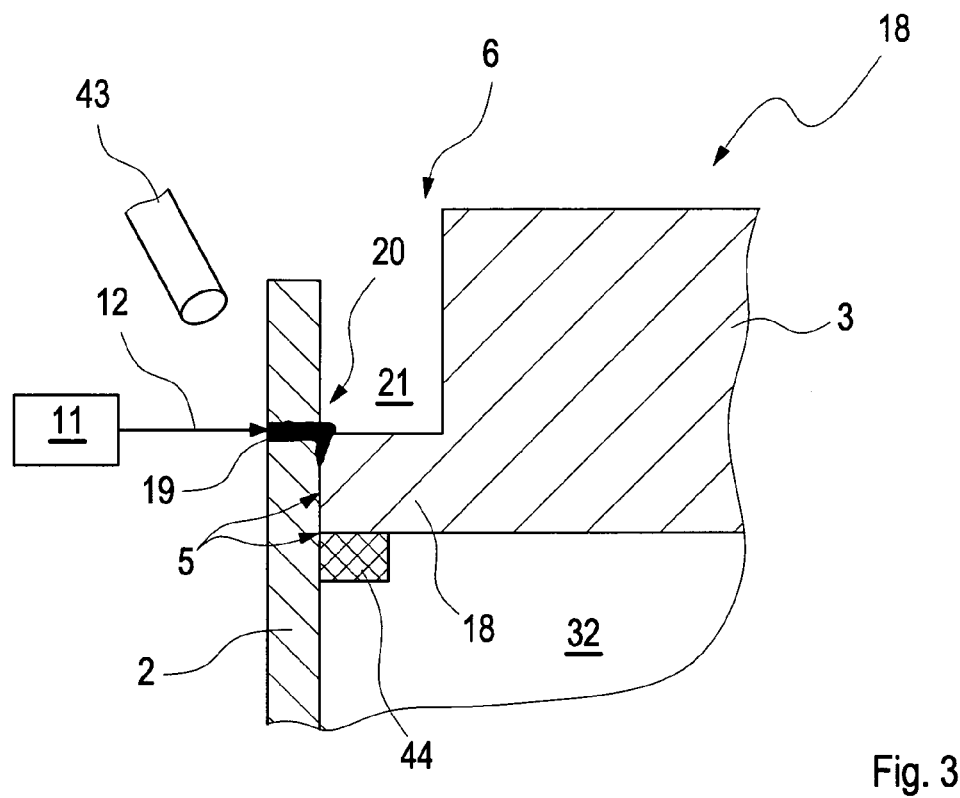
FIG. 3 shows another embodiment of a weld seam for joining two assemblies in a schematic cross section.

FIG. 3 shows another capsule 18 which has a capsule sheath 2 and a cover 3. In the exemplary embodiment illustrated in the present case, merely a thin web-type projection 18 is provided in edge region 6 of cover 3. Thus, there is no contact segment 7 (compare FIG. 1, FIG. 2). One advantage of this type of configuration is that cover 3 is simpler to manufacture. Similarly to the exemplary embodiment illustrated in FIG. 3, weld seam 19 is configured at edge side 20 of web-type projection 18 facing the outer side of capsule 18. In the exemplary embodiment illustrated in FIG. 3, laser beam 12 is directed from outside of capsule sheath 2 through capsule sheath 2 to contact region 5 between capsule sheath 2 and web-type projection 18 of cover 3. Just as in the exemplary embodiments shown in FIGS. 1 and 2, a supporting segment 44 may be provided for mechanical pre-fixing.

The thermal insulation of weld seam 19 illustrated in FIG. 3 is in the form of thin, web-type projection 18. In other words, due to the material cross section of web-type projection 18, only a relatively small amount of thermal energy is dissipated from welded joint 19. Thus, a very thin capsule sheath 2 may likewise be welded to a thick cover 3. Any combustion vapors potentially released in the area of weld seam 19 during the welding process may escape to the outside via the front side of weld seam 19 (outside of capsule sheath 2), in particular, however, also via hollow space 21 (formed by capsule sheath 2, web-type projection 18 and cover 3). Once again, virtually no contamination of capsule interior 32 occurs; here, as well, supporting segment 44 functioning as an additional gas barrier.

Figure 4:
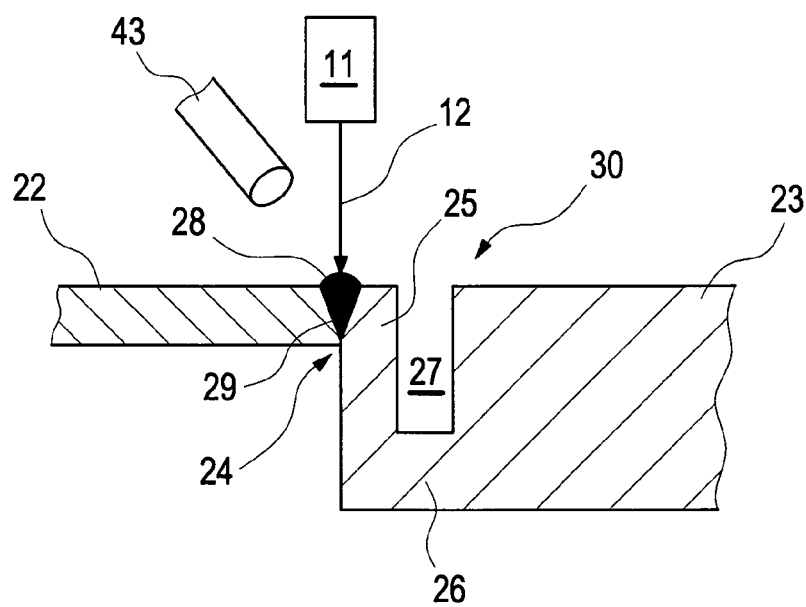
FIG. 4 shows yet another embodiment of a weld seam for joining two assemblies in a schematic cross section.

FIG. 4 shows how a thin sheet 22 may be bonded to a plate 23; in the exemplary embodiment shown in FIG. 4, thin sheet 22 and plate 23 meeting each other at the end faces in each case (thus, in the form of a butt joint) in a contact region 24.

In the case of plate 23, a groove 27 (acting as a thermal insulation device) is provided in edge region 30 of plate 23 facing contact region 24, so that a contact segment 25 forms in edge region 30 that is joined via a bridge segment 26 to the remaining plate 23 (compare FIG. 1, 2). Groove 27 acts as thermal insulation, so that, during the welding process, the thermal energy supplied by a laser 11 with the aid of a laser beam 12 is able to exit the area of weld seam 28 in the direction of plate 23 to only a greatly reduced extent. The dissipation of thermal energy in the direction of thin sheet 22 is already limited due to the small thickness of thin sheet 22. As is apparent from FIG. 4, the mechanical weakening of plate 23 by groove 27 is generally irrelevant, since the mechanical stability is already limited by the thickness of thin sheet 22. It is, of course, useful for bridge segment 26 to correspond in thickness more or less to thin sheet 22, or, as the case may be, to be designed to be thicker up to a certain dimension.

The energy introduced by laser beam 12 into the area of weld seam 28 leads to a softening, respectively to the melting of the material of thin sheet 22 and/or of the material of plate 23. In this context, the material may enter into contact region 24 between thin sheet 22 and plate 23 where it forms a weld root 29.

Figure 5:
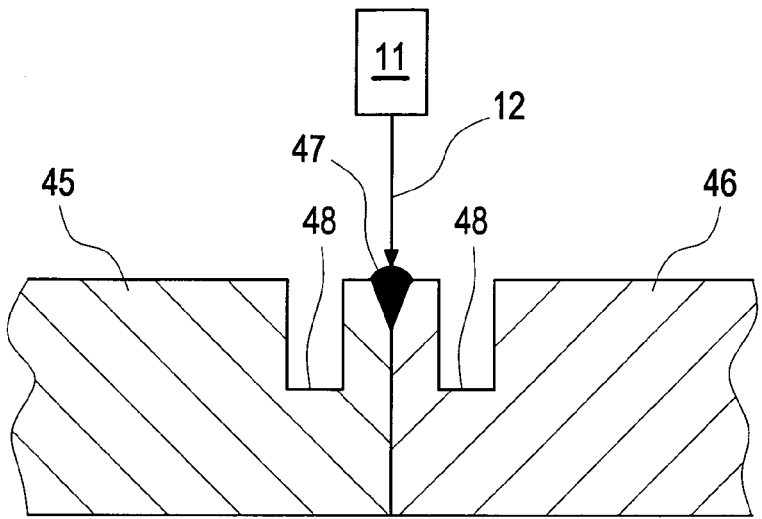
FIGS. 5a-c show other embodiments of weld seams for joining two assemblies in a schematic cross section.
Figure 5:
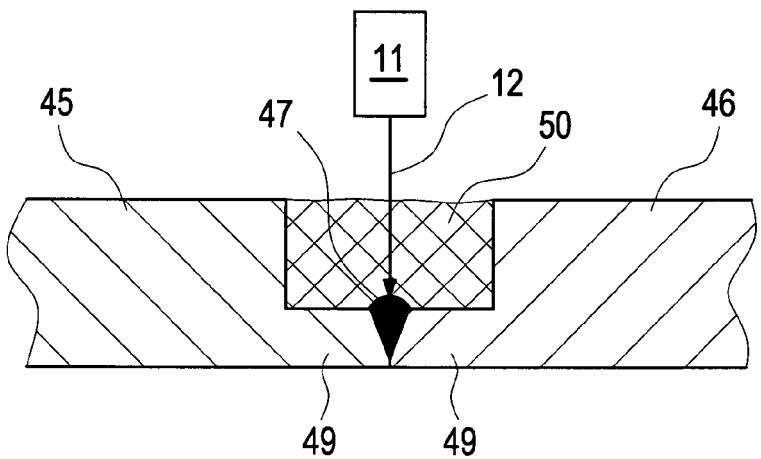
Figure 5:
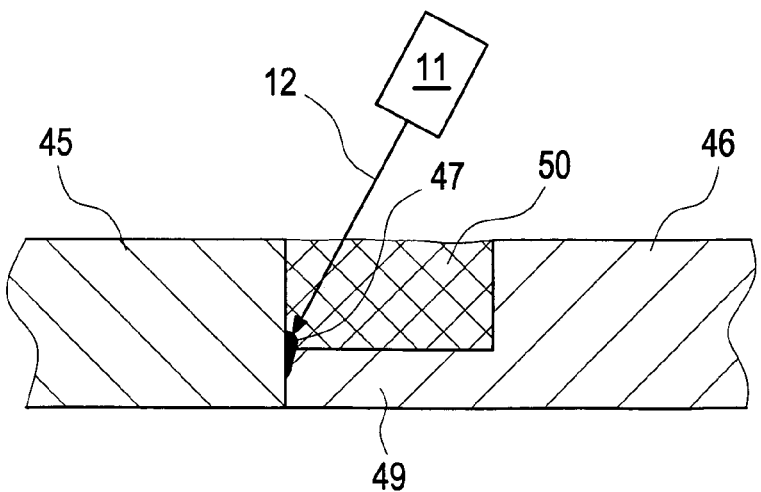

FIG. 5a through 5c show how, with the aid of a thermal insulation, two plates 45, 46 may be joined to one another by a weld seam 47.

In FIG. 5a, a groove 48 (thermal insulation device) is provided in each case in the area of weld seam 47 in both metal sheets 45, 46. Grooves 48 act as thermal insulation, so that the thermal energy input by a laser 11 into the area of weld seam 47 remains for the most part in the area of weld seam 47.

In FIG. 5b, the thermal insulation is provided in the form of an end-face tapering 49 of the two plates 45, 46. Only a relatively insignificant heat flow may flow off through the only thin segments 49, so that, here as well, the thermal energy input by laser 11 into the area of weld seam 47 remains for the most part in the area of weld seam 47. As is readily discernible in FIG. 5b, the formation of the end-face tapering 49 of each of the two plates 45, 46 initially leads to a considerable weakening of the strength in the area of the joint. To reduce the extent of this weakening, the joint may be filled with a filler 50 once weld seam 47 has formed. This may be a soldering agent or an adhesive, for instance. An epoxy resin would be conceivable in this case, for example. The filler may, in particular, reduce the join region's sensitivity to a torque load or a shearing load. On the other hand, the tensile strength of the joint and/or the fluid tightness of the joint are generally substantially provided by weld seam 47.

Finally, it is also shown in FIG. 5c that it may suffice to provide end face 49 of merely one plate 46 (in the exemplary embodiment of right plate 46 illustrated in FIG. 5c) with an end-face tapering 49. Laser beam 12 generated by laser 11 is then radiated into the region of weld seam 47 at an angle of 60°, for example (relative to the plane of plates 45, 46). In this case, the dissipation of the energy input into the region of weld seam 47 is at least reduced by end-face tapering 49 provided in right plate 46. In the present exemplary embodiment as well, it may prove to be useful for the join region to be filled with a filler material 50 following the formation of weld seam 47 in order to provide additional mechanical stability.

Figure 6:
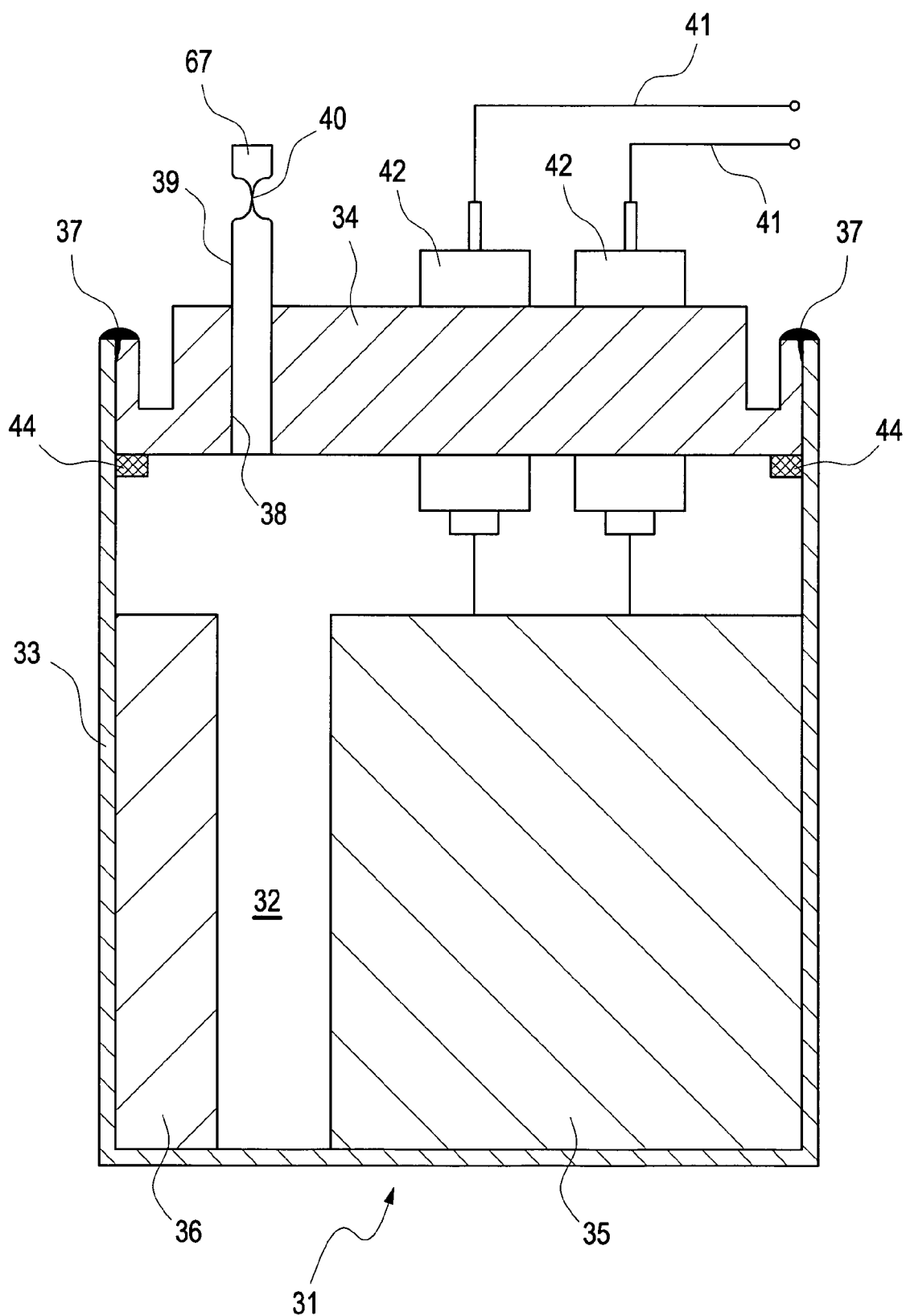
FIG. 6 shows an embodiment of a semiconductor detector that is encapsulated in a vacuum capsule, in a schematic cross section.

An exemplary embodiment of a detector capsule 31 is illustrated in FIG. 6 in a schematic cross-sectional view. Detector capsule 31 has a hollow space 32 that is formed by capsule container 33 and by a cover 34.

A semiconductor detector material 35 is located in hollow space 32 of detector capsule 31. To protect semiconductor detector material 35, hollow space 32 of detector capsule 31 is evacuated, thus, is under a vacuum.

To maintain a vacuum on a continuous basis in hollow space 32 of detector capsule 31, an ion getter material 36 is provided in a partial area of hollow space 32.

Capsule container 33 and cover 34 are welded to one another using a weld seam 37. Weld seam 37 may, for example, correspond to the weld seam illustrated in FIG. 1, the one illustrated in FIG. 2 or the one illustrated in FIG. 3. Deviations herefrom are also possible, of course.

A bore 38, into which an evacuation tube 39 is inserted, is provided in cover 34. Hollow space 32 of detector capsule 31 may be evacuated via evacuation tube 39. Evacuation tube 39 may be secured in cover 34 using customary fastening methods. Adhesive bonding methods, brazing methods or welding methods are suited, for example. It is expedient for the connection to be selected to correspond to the bonding class of weld seams 37. Also the sealing of evacuation tube 39 itself should correspond to the class of weld seam 37. It should be noted that the joining of evacuation tube 39 and cover 34 should also take place prior to the joining of the individual elements of detector capsule 31. Thus, in this case, joining methods may be used that are actually problematic for semiconductor detector material 35. In particular, a welding method and/or a soldering method may be used, where gaseous substances are potentially released (for example, vaporization of fluxing agent fractions).

Once individual elements 33, 34 of detector capsule 31 have been assembled, and weld seam 37 formed, hollow space 32 of detector capsule 31 may be evacuated via evacuation tube 39. As soon as detector capsule 31 is evacuated, evacuation tube 39 is sealed vacuum-tight in a sealing region 40. This may be carried out, for example, using the sealing method sketched in FIGS. 8a-8d, as well as in FIG. 9.

Figure 9:
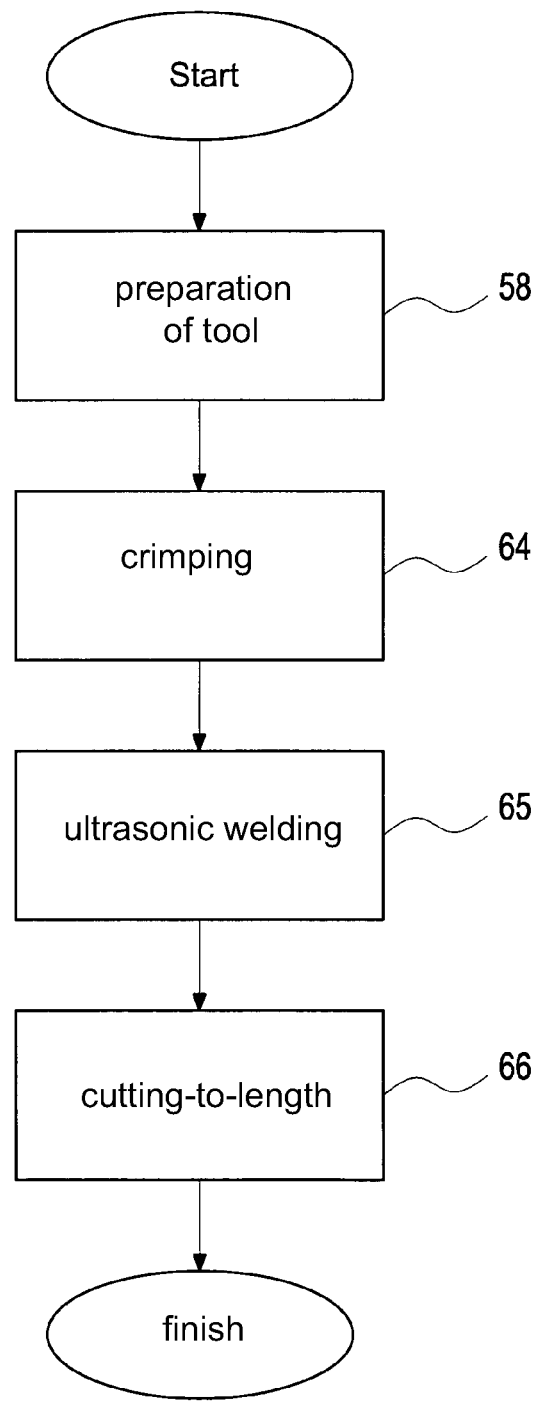
FIG. 9 shows a diagram for illustrating the method depicted in FIG. 8a-d.

A combination tool 57 is first applied to evacuation tube 39 in sealing region 40 (method step 58 in FIG. 9). Combination tool 57 has an anvil sonotrode 59 and a welding sonotrode 60 corresponding thereto which, together, form an ultrasonic welding tool 61. Configured adjacently to welding sonotrode 60 of ultrasonic welding tool 61 is additionally a cutting tool 62. Anvil sonotrode 59, welding sonotrode 60, as well as cutting tool 62 are movably mounted (for example, on robot arms) and may be moved accordingly. In some instances, a plurality of components of combination tool 57 may be mounted on a common holder and controlled via suitable actuators.

Anvil sonotrode 59, as well as welding sonotrode 60 of ultrasonic welding tool 61 are designed to be relatively stable. This makes it possible for inner cross section 63 of evacuation tube 39 to be crimped together with the aid of combination tool 57 (in particular, using anvil sonotrode 59 and welding sonotrode 60) in such a way that the inner walls of evacuation tube 39 contact one another ($2^{nd}$ method step 64; FIG. 9). The resulting crimped state is shown in FIG. 8b.

Once the crimped state of evacuation tube 39 is reached, as illustrated in FIG. 8b, anvil sonotrode 59 and/or welding sonotrode 60 of ultrasonic welding tool 61 are sonicated. An ultrasonic welding of the inner walls of evacuation tube 39 in sealing region 40 of evacuation tube 39 is thereby accomplished (method step 65, FIG. 9).

Figure 8:
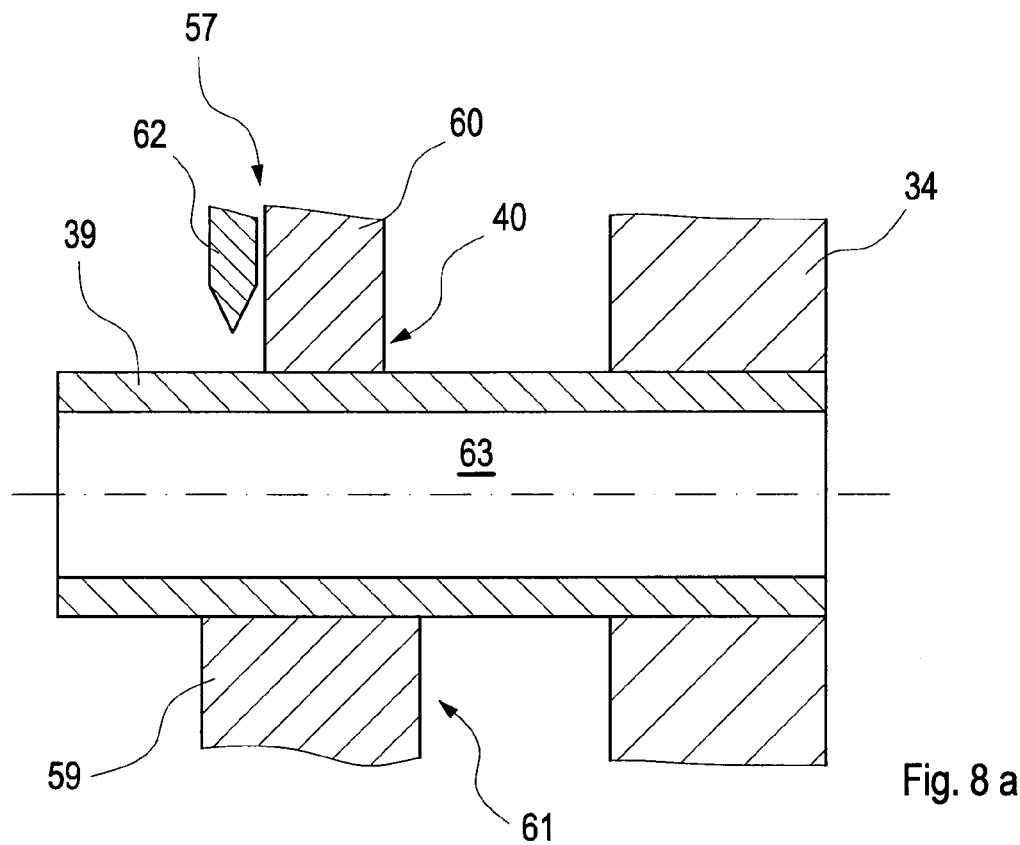
FIGS. 8a-d show an embodiment for forming a vacuum-tight seal of an evacuation tube and a subsequent cutting-to-length of the tube.
Figure 8:
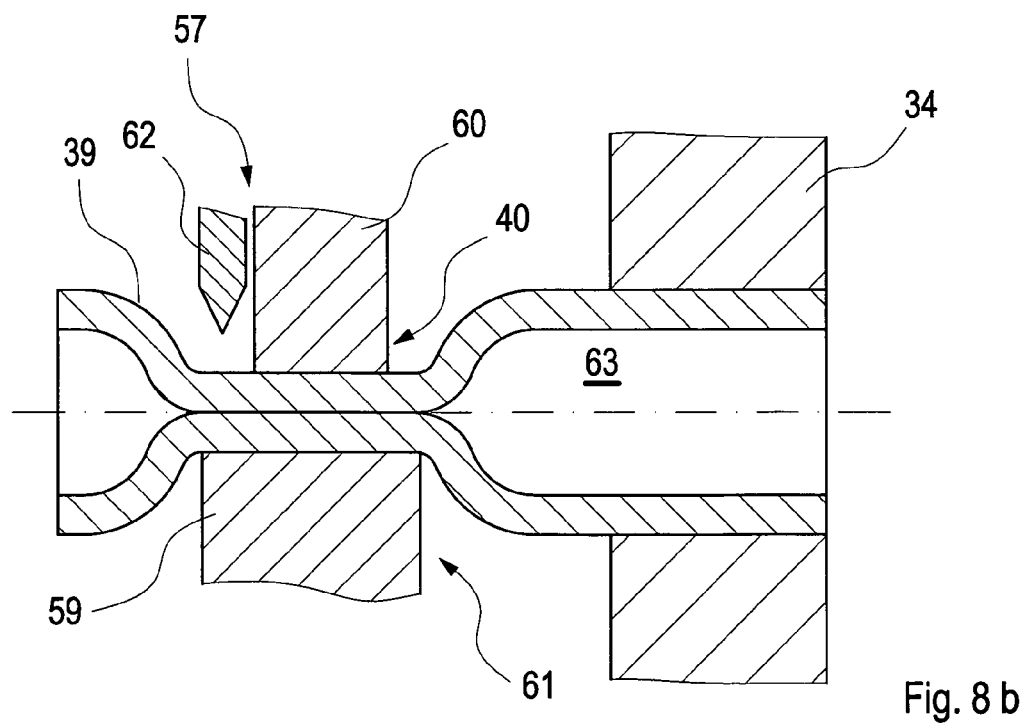
Figure 8:
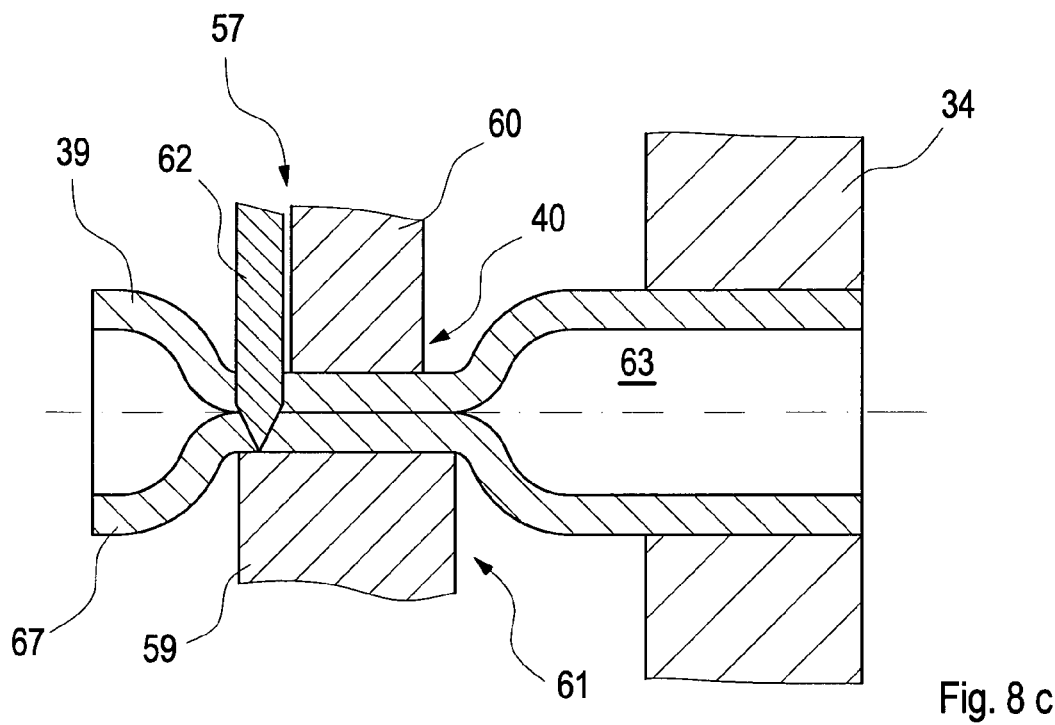
Figure 8:
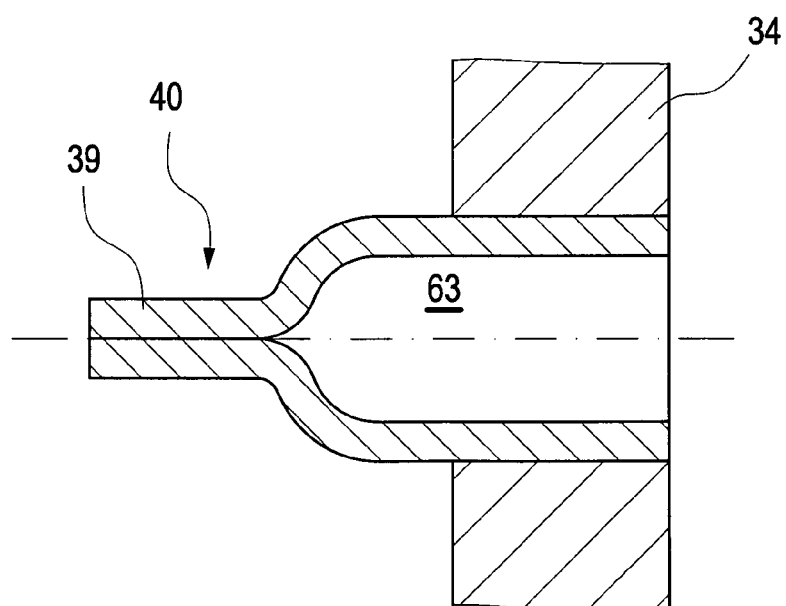

Once ultrasonically welded bond 40 of evacuation tube 39 is formed vacuum-tight in the present case, cutting tool 62 of combination tool 57 is urged forward, (in FIG. 8, downward). In this context, anvil sonotrode 59 and welding sonotrode 60 act, on the one hand, as a positioning means. On the other hand, anvil sonotrode 59 is designed to have such a width (in particular, wider than welding sonotrode 60) that it may serve simultaneously as a stop face for cutting tool 62. This is readily discernible in FIG. 8c.

Protruding section 67 of evacuation tube 39 is cut to length by the forward movement of cutting tool 62 (method step 66; FIG. 9). FIG. 8d shows the configuration following completion of the cutting-to-length process.

However, it is also perfectly conceivable that protruding section 67 remains on evacuation tube 39. This is shown in FIG. 6.

As soon as detector capsule 31 is evacuated, evacuation tube 39 is sealed vacuum-tight in a sealing region 40. This may be realized, for example, in that evacuation tube 39 is initially crimped in sealing region 40 and is subsequently metallurgically sealed.

In addition, voltage bushings 42 are discernible in cover 34 of detector capsule 31. Via these voltage bushings 42, semiconductor detector material 35 may be supplied with current via electrical lines 41, respectively, a signal may be conducted from semiconductor detector material 35. Voltage bushings 42 in cover 34 are likewise designed to be vacuum-tight.

Figure 10:
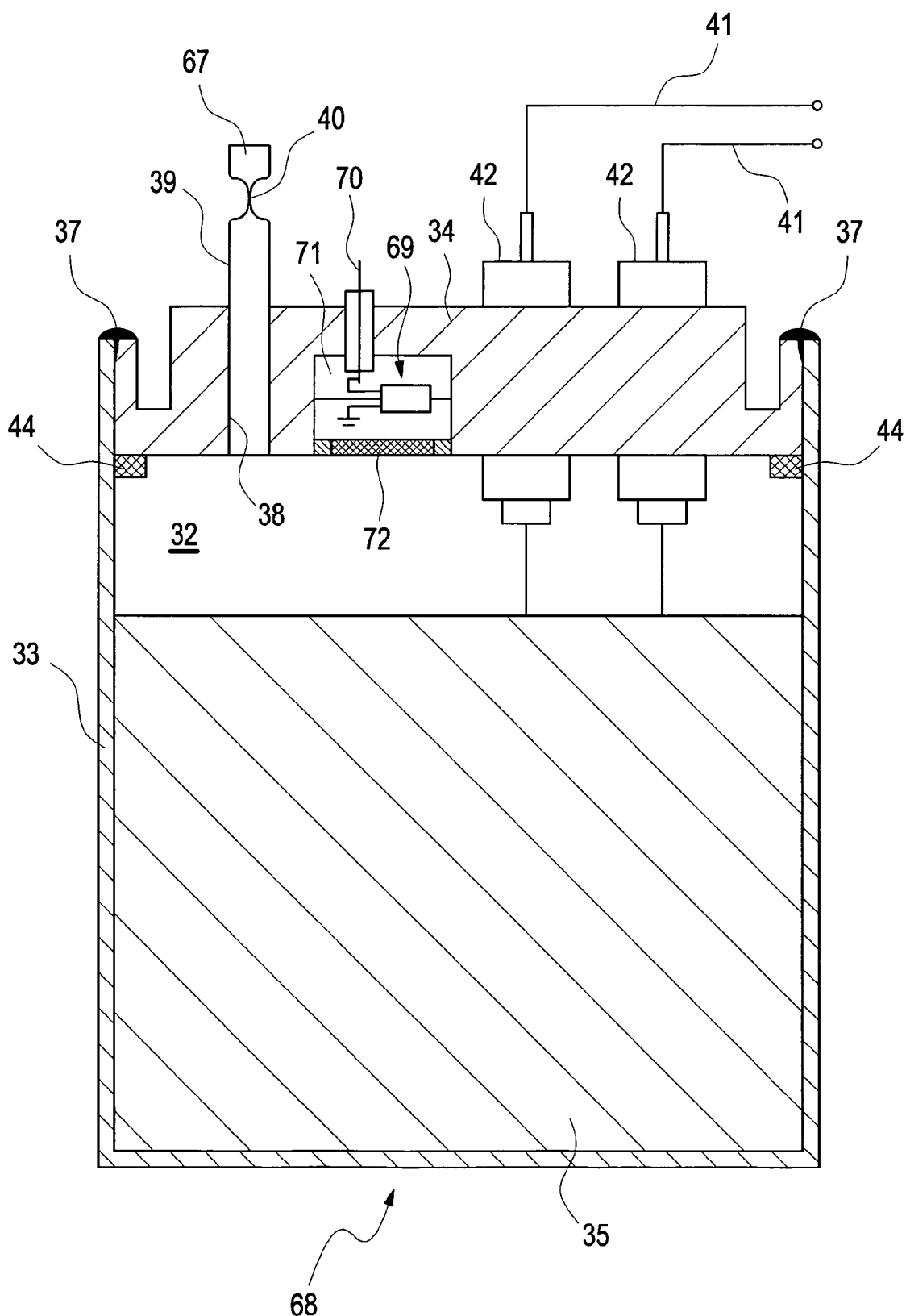
FIG. 10 shows another embodiment of a semiconductor detector that is encapsulated in a vacuum capsule, in a schematic cross section.

A second exemplary embodiment of a detector capsule 68 is illustrated in FIG. 10 in a schematic cross-sectional view. The configuration of detector capsule 68 illustrated in the present case in FIG. 10 resembles that of detector capsule 31 illustrated in FIG. 6.

However, in contrast to detector capsule 31 in accordance with FIG. 6, in the case of detector capsule 68 illustrated in the present case, no ion getter material is located in actual hollow space 32 of detector capsule 68. This makes it possible to provide semiconductor detector material 35 with a greater volume, for example, in order to thereby enhance the sensitivity of the detector, or to reduce its internal noise.

To realize a longest possible service life of sealed detector capsule 68, the high vacuum introduced into hollow space 32 of detector capsule 68 must be maintained for as long as possible. To this end, a thermally activatable ion getter 69 is provided in the exemplary embodiment of detector capsule 68 illustrated in the present case. Thermally activatable ion getter 69 may be energized with an electric current via an electrical connecting line 70 (ground connection is implemented in the present case in the exemplary embodiment illustrated in FIG. 10 via cover 34 and/or capsule container 33 of detector capsule 68), and thereby heated. Thermally activatable ion getter 69 may be a commercial St-172 SAES getter, for example. Thermally activatable ion getters 69 of this material have a relatively low activation temperature of merely 450° C. (given a large quantity of residual gas in hollow space 32, higher temperatures of up to 900° C. may even be necessary). However, given an adequate preparation of the components of detector capsule 68 (for example, degreasing, cleaning, baking and polishing of the corresponding surfaces, respectively components), the required activation temperature may generally be left within a range close to 450° C. Following the thermal activation of thermal getter element 69, getter element 69 serves as a "continuous vacuum pump."

In the present case, thermally activatable getter element 69 is located in a hollow space 71 that was formed in essentially massively constructed cover 34 of detector capsule 68. This makes it possible for hollow space 32 that is present in the interior of detector capsule 68 to be utilized in the best possible way for semiconductor detector material 35. It should be noted that, due to (high-) voltage bushings 42, both of evacuation tube 39 (which must be integrated into cover 34, in each case in a high vacuum-tight manner), as well as of the special design implementation of weld seams 37, cover 34 of detector capsule 68 must already have a certain thickness. Therefore, there is no need to "artificially" (or, if need be, slightly) increase the thickness of cover 34 to form receiving space 71 for accommodating thermally activatable getter material 69.

A problem in the case of activatable ion getter 69 used in the present case is that, during the heating phase (for thermally activating ion getter 69 and/or, over the course of time, due to the absorption of gases from thermally activatable ion getter 69), small particles may flake off.

However, a contacting of such particles of ion getter material and of semiconductor detector material 35 is to be avoided. For this reason, a filter disk 72 is configured between receiving space 71 and hollow space 32 of detector capsule 38. In the exemplary embodiment illustrated in the present case, filter disk 72 of detector capsule 68 is made of a mesh material, which is arranged in a plurality of superimposed layers. The mesh material itself is fabricated of stainless steel in the particular case, so that filter disk 72 is also able to be prepared in the customary manner for use in high-vacuum technology (for example, by cleaning, baking and the like). Filter disk 72 prevents any particles, which potentially flake off from thermally activatable ion getter 69, from remaining trapped in receiving space 71 of cover 34, and, therefore, from being able to damage semiconductor detector material 35.

Since the object of filter disk 72, namely the restraining of solid particles, may also be realized with a relatively large mesh aperture of the mesh material that is used, only a relatively small resistance results for gas to be absorbed from thermally activatable getter element 69. As a result, a high-quality vacuum may be made available in hollow space 32. Due to the relatively large mesh aperture of the mesh material that is used for filter disk 72, it is normally still possible for light and/or infrared radiation to pass through. Therefore, filter disk 72 used in the exemplary embodiment illustrated in the present case usually does not have a thermally insulating effect. However, it is self-evident that it is also possible for filter disk 72 to also have a thermally insulating function, due to the formation, respectively configuration thereof.

Figure 7:
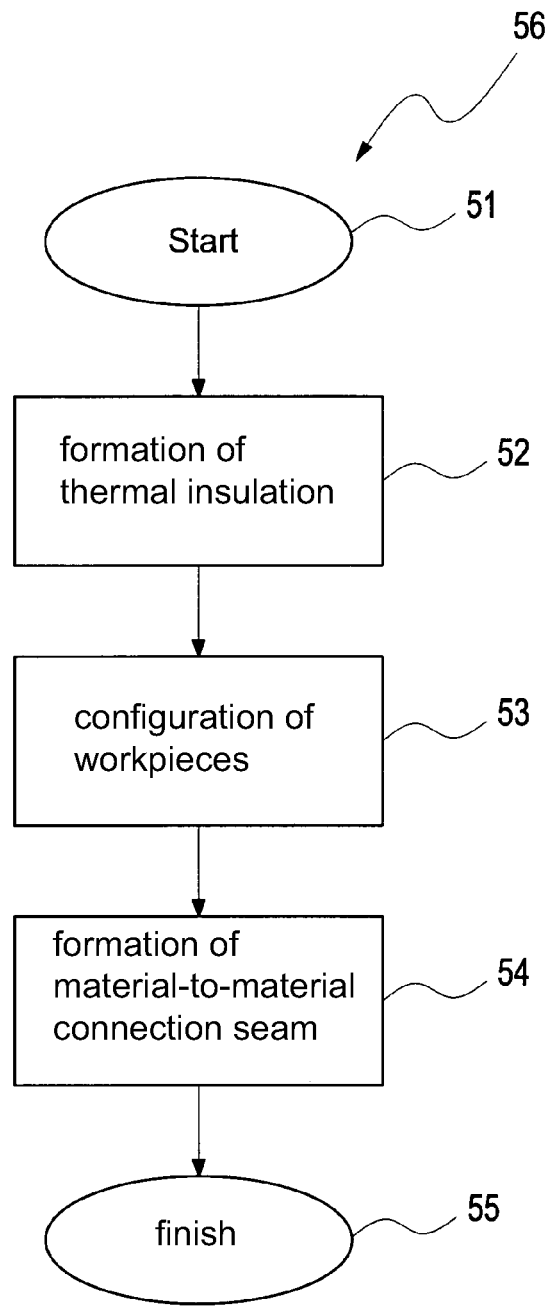
FIG. 7 shows a diagram for illustrating one possible method for forming weld seams.

FIG. 7 schematically shows one possible sequence 56 of method steps for forming a material-to-material connection seam, in particular of a welded seam or a brazed seam.

The method begins at point 51, where, for example, two workpieces 2, 3, 22, 23, 45, 46, which are to be joined together, are prepared.

Subsequently, in step 52, adjacently to the later join region, a thermal insulation 8, 9, 18, 21, 27, 48, 49 is formed in at least one of workpieces 2, 3, 22, 23, 45, 46, for example, in that a groove 9, 27, 48 is milled into a suitable region of a workpiece 2, 3, 22, 23, 45, 46.

Subsequently thereto, the two workpieces are configured with their join regions 2, 3, 22, 23, 45, 46 adjacently to one another in a further step 53. The configuration may be implemented as a butt joint, corner joint, cross joint or lap joint, for example. Here as well, it is useful to provide a mechanical pre-fixing, such as in the form of a transition fit or a press fit, for example.

Finally, in method step 54, the two workpieces 2, 3, 22, 23, 45, 46 are joined to one another by the formation of a material-to-material connection seam 2, 3, 22, 23, 45, 46.

Subsequently thereto, the connection is produced 55, and workpiece configuration 2, 3, 22, 23, 45, 46 may be used for other purposes.

An additional disclosure of the present invention described here is included in the German Patent Application that was filed on the same day at the German Patent and Trademark Office under file number GS108002-B of the Applicant. The content of this patent application is incorporated in its entirety by reference in the disclosure of the present patent application.

While the invention has been particularly shown and described with reference to preferred embodiments thereof, it will be understood by those skilled in the art that various changes in form and details may be made therein without departing from the spirit and scope of the invention.

What is claimed is:

1. A workpiece arrangement comprising:
   at least two join regions of at least one workpiece that are in contact with one another over a mechanically pre-fixed contact region of the two join regions, the at least two join regions having an H7 it and being joined together by a material-to-material connection seam, the material-to-material connection seam covering only a portion of the contact region; and
   a thermal insulation device disposed in an area of the material-to-material connection seam and corresponding to the first of the at least two join regions.

2. The workpiece arrangement as recited in claim 1, wherein the thermal insulation device includes a region of thinned material.

3. The workpiece arrangement as recited in claim 1, wherein at least a portion of the material-to-material connection seam is asymmetrical with respect to a contact region of the at least two join regions.

4. The workpiece arrangement as recited in claim 1, wherein at least a portion of the at least two join regions differ in thickness.

5. The workpiece arrangement as recited in claim 1, wherein at least a portion of at least one of the at least two join regions is planar.

6. The workpiece arrangement as recited in claim 1, wherein at least a portion of the at least two join regions are substantially linear.

7. The workpiece arrangement as recited in claim 1, wherein at least a portion of the at least two join regions are disposed substantially at a right angle to one another.

8. The workpiece arrangement as recited in claim 1, wherein at least a portion of a first of the join regions is fitted within a second of the join regions by at least one of a transition fit and a force fit.

9. The workpiece arrangement as recited in claim 1, wherein at least one of the at least two join regions includes at least one of metal, metal alloys, aluminum, aluminum alloys, $AlMg_3$, $AlMg_{4.5}Mn$, steel, steel alloys, stainless steel, copper, copper alloys, nickel, nickel alloys, a material characterized by low gas emission rates and a material that is free of gas emission.

10. The workpiece arrangement as recited in claim 1, wherein the material-to-material connection seam includes a bonding material including at least one of metal, metal alloys, aluminum, aluminum alloys, $AlMg_3$, $AlMg_{4.5}Mn$, steel, steel alloys, stainless steel, copper, copper alloys, nickel, nickel alloys, a material characterized by low gas emission rates and a material that is free of gas emission.

11. The workpiece arrangement as recited in claim 1, wherein the material-to-material connection seam is separable.

12. A workpiece arrangement comprising:
at least two join regions of at least one workpiece that are in contact with one another over a contact region, the at least two join regions having an H7 fit and being joined together by a material-to-material connection seam, at least a portion of the material-to-material connection seam being asymmetrical with respect to the contact region of the at least two join regions, wherein at least a portion of a first of the join regions is fitted within a second of the join regions by at least one of a transition fit and a force fit; and
a thermal insulation device disposed in an area of the material-to-material connection seam and corresponding to the first of the at least two join regions.

13. A housing comprising
a workpiece arrangement including:
at least two join regions of at least one workpiece that are in contact with one another over a mechanically pre-fixed contact region of each of the two join regions, the at least two join regions having an H7 fit and being joined together by a material-to-material connection seam, the material-to-material connection seam covering only a portion of the contact region; and
a thermal insulation device disposed in an area of the material-to-material connection seam and corresponding to the first of the at least two join regions.

14. The housing recited in claim 13, wherein the housing is configured for devices operated under at least one of a vacuum and a protective gas.

15. The housing recited in claim 13, the housing including an interior housing space at least one receiving region configured to accommodate a getter material, and a connection between the interior housing space and the receiving region including a particle impervious connection.

16. The housing recited in claim 15, wherein the particle-impervious connection includes a filter device.

17. The housing recited in claim 15, wherein at least a portion of the receiving region is disposed in a material region of the housing having a massive construction.

18. The housing recited in claim 15, further comprising a getter material disposed in the receiving region.

19. The housing recited in claim 13, further comprising a fluid line penetrating a wall of the housing.

20. A method of joining regions of at least one workpiece, the method comprising:
providing at least two join regions of at least one workpiece, the join regions being in contact with one another over a mechanically pre-fixed contact region of the join regions, the join regions having an H7 fit;
forming a material-to-material connection seam joining at least a portion of the join regions, the material-to-material connection seam covering only a portion of the contact region; and
thermally insulating at least a portion of at least one of the join regions during the forming of the material-to-material connection seam.

21. The method of joining regions of at least one workpiece recited in claim 20, wherein the joining of the regions of the at least one workpiece forms a housing.

22. The method of joining regions of at least one workpiece recited in claim 20 wherein the forming the material-to-material connection includes introducing thermal energy into at least one of the at least two join regions.

23. The method of joining regions of at least one workpiece recited in claim 22 wherein introduction of thermal energy is carried out using an energy input device including at least one of a laser, excimer laser, semiconductor laser, CO2 laser, dye laser, solid-state laser, gas laser, acoustic energy source, ultrasound source, electron beam source, electrical resistance device, high current electrical source and frictional energy input device.

24. The workpiece arrangement as recited in claim 1, wherein the material-to-material connection is provided using an energy input device including at least one of a laser, excimer laser, semiconductor laser, CO2 laser, dye laser, solid-state laser, gas laser, acoustic energy source, ultrasound source, electron beam source, electrical resistance device, high current electrical source and frictional energy input device.

* * * * *